US008392590B2

(12) United States Patent
Bouchard et al.

(10) Patent No.: US 8,392,590 B2
(45) Date of Patent: Mar. 5, 2013

(54) DETERMINISTIC FINITE AUTOMATA (DFA) PROCESSING

(75) Inventors: Gregg A. Bouchard, Round Rock, TX (US); David A. Carlson, Haslet, TX (US); Richard E. Kessler, Shrewsbury, MA (US); Muhammad R. Hussain, Pleasanton, CA (US)

(73) Assignee: Cavium, Inc., San Jose, CA (US)

( * ) Notice: Subject to any disclaimer, the term of this patent is extended or adjusted under 35 U.S.C. 154(b) by 1244 days.

(21) Appl. No.: 11/221,408

(22) Filed: Sep. 7, 2005

(65) Prior Publication Data

US 2006/0069872 A1    Mar. 30, 2006

Related U.S. Application Data

(60) Provisional application No. 60/609,211, filed on Sep. 10, 2004, provisional application No. 60/669,672, filed on Apr. 8, 2005.

(51) Int. Cl.
*G06F 15/16* (2006.01)
*G06F 17/28* (2006.01)

(52) U.S. Cl. .......................................... 709/230; 704/2

(58) Field of Classification Search .............. 704/2, 221, 704/243; 707/2; 711/100; 709/230
See application file for complete search history.

(56) References Cited

U.S. PATENT DOCUMENTS

| | | | |
|---|---|---|---|
| 5,230,061 A | 7/1993 | Welch | |
| 5,327,544 A | 7/1994 | Lee et al. | |
| 6,047,283 A | 4/2000 | Braun | |
| 6,076,087 A * | 6/2000 | Suciu | ............................ 707/3 |
| 6,192,282 B1 | 2/2001 | Smith et al. | |
| 6,493,698 B1 * | 12/2002 | Beylin | ................................ 1/1 |
| 6,925,641 B1 * | 8/2005 | Elabd | ........................... 718/101 |
| 6,952,694 B2 * | 10/2005 | Mathur et al. | ........................ 1/1 |
| 7,028,141 B2 * | 4/2006 | Ohba | ........................... 711/119 |
| 7,046,848 B1 | 5/2006 | Olcott | |
| 7,085,918 B2 * | 8/2006 | Sharangpani et al. | ........ 712/217 |
| 7,093,023 B2 * | 8/2006 | Lockwood et al. | ........... 709/231 |
| 7,185,081 B1 | 2/2007 | Liao | |
| 7,188,168 B1 | 3/2007 | Liao | |
| 7,225,188 B1 * | 5/2007 | Gai et al. | ........................... 707/6 |
| 7,240,048 B2 | 7/2007 | Pontius | |
| 7,301,541 B2 | 11/2007 | Hansen et al. | |
| 7,305,372 B2 * | 12/2007 | Bridges et al. | .................. 706/45 |
| 7,308,446 B1 | 12/2007 | Panigrahy et al. | |
| 7,454,588 B2 * | 11/2008 | Greicar | ........................ 711/171 |

(Continued)

FOREIGN PATENT DOCUMENTS

| | | |
|---|---|---|
| EP | 1607823 A2 | 12/2005 |
| WO | WO2004/013777 A1 | 2/2004 |

(Continued)

OTHER PUBLICATIONS

Schuehler, David V., et al., "Architecture for a Hardware-Based, TCIP/IP Content-Processing System," *IEEE Computer Society*, pp. 62-69 (Jan.-Feb. 2004).

(Continued)

*Primary Examiner* — Catherine Thiaw

(74) *Attorney, Agent, or Firm* — Hamilton, Brook, Smith & Reynolds, P.C.

(57) ABSTRACT

A processor for traversing deterministic finite automata (DFA) graphs with incoming packet data in real-time. The processor includes at least one processor core and a DFA module operating asynchronous to the at least one processor core for traversing at least one DFA graph stored in a non-cache memory with packet data stored in a cache-coherent memory.

13 Claims, 13 Drawing Sheets

U.S. PATENT DOCUMENTS

| | | | |
|---|---|---|---|
| 7,689,530 | B1 | 3/2010 | Williams, Jr. et al. |
| 7,949,683 | B2 | 5/2011 | Goyal |
| 8,180,803 | B2 | 5/2012 | Goyal |
| 2002/0099909 | A1* | 7/2002 | Meyer .......................... 711/117 |
| 2003/0051043 | A1* | 3/2003 | Wyschogrod et al. ........ 709/230 |
| 2003/0065800 | A1 | 4/2003 | Wyschogrod et al. |
| 2003/0110208 | A1* | 6/2003 | Wyschogrod et al. ........ 709/202 |
| 2003/0195874 | A1 | 10/2003 | Akaboshi |
| 2004/0049596 | A1 | 3/2004 | Schuehler et al. |
| 2004/0059443 | A1* | 3/2004 | Sharangpani ................... 700/48 |
| 2004/0071152 | A1 | 4/2004 | Wolrich et al. |
| 2004/0083387 | A1 | 4/2004 | Dapp et al. |
| 2004/0098384 | A1 | 5/2004 | Min et al. |
| 2004/0162826 | A1 | 8/2004 | Wyschogrod et al. |
| 2004/0172234 | A1 | 9/2004 | Dapp et al. |
| 2004/0176945 | A1 | 9/2004 | Inagaki et al. |
| 2004/0179477 | A1 | 9/2004 | Lincoln et al. |
| 2004/0215593 | A1* | 10/2004 | Sharangpani et al. ............ 707/1 |
| 2004/0225999 | A1 | 11/2004 | Nuss |
| 2004/0250045 | A1* | 12/2004 | Dowling ......................... 712/10 |
| 2004/0267779 | A1 | 12/2004 | Carter et al. |
| 2005/0012521 | A1 | 1/2005 | Sharangpani et al. |
| 2005/0097514 | A1 | 5/2005 | Nuss |
| 2005/0108518 | A1 | 5/2005 | Pandya |
| 2005/0138276 | A1* | 6/2005 | Navada et al. ................. 711/105 |
| 2005/0238010 | A1 | 10/2005 | Panigrahy et al. |
| 2005/0238022 | A1* | 10/2005 | Panigrahy ..................... 370/392 |
| 2005/0240999 | A1 | 10/2005 | Rubin et al. |
| 2005/0251509 | A1* | 11/2005 | Pontius ............................. 707/3 |
| 2005/0273450 | A1 | 12/2005 | McMillen et al. |
| 2006/0059165 | A1 | 3/2006 | Bosloy et al. |
| 2006/0075206 | A1 | 4/2006 | Bouchard et al. |
| 2006/0085533 | A1 | 4/2006 | Hussaine et al. |
| 2006/0101195 | A1 | 5/2006 | Jain |
| 2006/0242123 | A1 | 10/2006 | Williams, Jr. |
| 2007/0038798 | A1 | 2/2007 | Bouchard et al. |
| 2007/0133593 | A1 | 6/2007 | Shankara |
| 2007/0276788 | A1 | 11/2007 | Cohen |
| 2008/0046423 | A1 | 2/2008 | Khan et al. |
| 2008/0263665 | A1 | 10/2008 | Ma et al. |
| 2009/0037379 | A1 | 2/2009 | Bou-Diab et al. |
| 2009/0119399 | A1 | 5/2009 | Hussain et al. |
| 2009/0138440 | A1 | 5/2009 | Goyal et al. |
| 2009/0138494 | A1 | 5/2009 | Goyal et al. |
| 2010/0114973 | A1 | 5/2010 | Goyal |

FOREIGN PATENT DOCUMENTS

| | | |
|---|---|---|
| WO | WO 2006/031659 A2 | 3/2006 |
| WO | WO 2009/070191 A1 | 6/2009 |
| WO | WO2009/070192 A1 | 6/2009 |

OTHER PUBLICATIONS

Handout 1, "Regular Expressions and Finite Automata," pp. 1-8 http://www.developer.com/tech/article.php.

Bradley, Tony, "Introduction to Intrusion Detection Systems (IDS)," http://netsecurity.about.com/cs/hackertools/a/aa030504.htm and http://searchsecurity.techtarget.com/sDefinition/0,,sid14_gci295031,00.html.

Mertz, David, "Learning to Use Regular Expressions, Introduction to the Tutorial," Gnosis Software, http://gnosis.cx/publish/programming/regular_expressions.html, pp. 1-16, downloaded Jan. 11, 2005.

Melvin, S., et al., "A Massively Multithreaded Packet Processor," Paper presented at NP2: Workshop on Network Processors, held in conjunction with The 9th International Symposium on High-Performance Computer Architecture, Anaheim, CA (Feb. 2003).

May 16, 2006, International Search Report, PCT/US2005/032236.

May 16, 2006, Written Opinion of the International Searching Authority, PCT/US2005/032236.

International Preliminary Report on Patentability and Written Opinion for PCT/US2008/011543, mailed Jun. 10, 2010.

European Examination Report for European Application No. 05812863.8, mailed May 14, 2008.

Alicherry et al., "High Speed Pattern Matching for Network IDS/IPS," IEEE, pp. 187-196, 2006.

Candan et al., "Afilter: Adaptable XML Filtering with Prefix-Caching and Suffix-Caching," VLDB '06 Sep. 12-15, 2006, Seoul, Korea, pp. 559-570.

International Search Report from PCT/US2008/011545 mailed on Mar. 2, 2009.

International Search Report from PCT/US2008/011543 mailed on Mar. 2, 2009.

Written Opinion for PCT/US2008/011545 mailed on Mar. 2, 2009.

Daciuk, J. "Experiments with Automata Compression," Database Inspec [online] The Institution of Electrical Engineers, GB (2000) and Proceedings of Fifth International Conference on Implementation and Application of Automata: 113-119 (Jul. 24, 2000-Jul. 25, 2000).

Anonymous, Graph (data structure) [online] Oct. 2007 [retrieved on Oct. 3, 2007] Retrieved from the Internet URL: http://en.wikipedia.org/w/index.php?title=graph_(data structure) &o . . . .

Vahid, F., "The Softening of Hardware," Computer, 36(4): 27-34 (Apr. 2003).

McConnell, S., "Who Needs Software Engineering?" IEEE Software, 18(1): 5-8 (Jan.-Feb. 2001).

Tewari, et al., A Parallel DFA Minimization Algorithm, S. Sahni, et al. (Eds.) HiPC 2002, LNCS 2552, pp. 31-40, 2002.

Ciura, et al., Software-Practice and Experience, 31:1007-1090, 2001.

Dharmapurikar, et al., "Design and Implementation of a String Matching System for Network Intrusion Detection using FPGA-based Bloom Filters," Washington University Dept. of Computer Science and Engineering: Technical Report WUCS-2004-012 (2004).

Ramakrishnan, et al., Proceedings of the 2006 Conference on Emperical Methods in Natural Language Processing (EMNLP 2006), pp. 492-500, Sydney, Jul. 2006).

Tanenbaum, A., "Structured computer organization" (2nd ed.), Prentice-Hall, Inc., Upper Saddle River, NJ (1984).

International Preliminary Report on Patentability and Written Opinion, PCT/US2008/011545, mailed Jun. 10, 2010.

International Preliminary Report on Patentability for PCT/US2005/032236 and Written Opinion of the International Searching Authority; Date Mailed: Mar. 13, 2007.

Deshpande, P.S. and Kakde, O.G., "C & Data Structures," 2003, Charles River Media: 217-221.

Ciura et al., "How to Squeeze a Lexicon," Software—Practice and Experience 2001; 31(11):1-11.

* cited by examiner

DETERMINISTIC FINITE AUTOMATA (DFA) PROCESSING

RELATED APPLICATIONS

This application claims the benefit of U.S. Provisional Application Nos. 60/609,211, filed on Sep. 10, 2004, and 60/669,672, filed on Apr. 8, 2005. The entire teachings of the above applications are incorporated herein by reference.

BACKGROUND OF THE INVENTION

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L4-L7 network protocols that require more intelligent processing. For example, the Transmission Control Protocol (TCP)—an L4 network protocol requires several compute intensive tasks including computing a checksum over the entire payload in the packet, management of TCP segment buffers, and maintaining multiple timers at all times on a per connection basis. Although a general purpose processor can perform the compute intensive tasks, it does not provide sufficient performance to process the data so that it can be forwarded at wire-speed.

Furthermore, content aware applications that examine the content of packets require searching for expressions, which contain both fixed strings and character classes repeated a variable number of times, in a data stream. Several search algorithms are used to perform this task in software. One such algorithm is the Deterministic Finite Automata (DFA). There are limitations when using the DFA search algorithm, such as, exponential growth of graph size and false matches in a data stream with repeated patterns.

Due to these limitations, content processing applications require a significant amount of post processing of the results generated by pattern search. Post processing requires qualifying the matched pattern with other connection state information such as type of connection, and certain values in a protocol header included in the packet. It also requires certain other types of compute intensive qualifications, for example, a pattern match is valid only if it is within a certain position range within data stream, or if it is followed by another pattern and within certain range from the previous pattern or after/at a specific offset from the previous pattern. For example, regular expression matching combines different operators and single characters allowing complex expressions to be constructed.

SUMMARY OF THE INVENTION

The present invention is directed to increasing the speed at which a processor can perform content processing applications. The processor includes at least one processor core and a deterministic finite automata (DFA) module operating asynchronous to the at least one processor core for traversing at least one DFA graph stored in a first memory with packet data stored in a second memory.

The DFA module can include a first memory controller, at least one DFA thread engine, and instruction input logic. The processor core can submit DFA instructions to the DFA module through an instruction queue of the instruction input logic. The DFA instructions can indicate the packet data stored in the second memory to use and the DFA graph stored in the first memory to traverse. The DFA module can schedule the DFA instruction to the DFA thread engine. The DFA thread engine can fetch the packet data stored in the second memory, and issue memory access instructions responsive to the fetched packet data.

For example, the first memory can be a non-cached memory and the second memory can be a cache-coherent memory. A DFA thread engine fetches packet data stored in the cache-coherent memory sequentially, one byte at a time. The DFA thread engine then issues a non-cached memory load instruction per byte of packet data received from the cache-coherent memory to traverse a next state of the DFA graph stored in the non-cached memory. The DFA thread engine also writes intermediate and final results to the cache-coherent memory.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
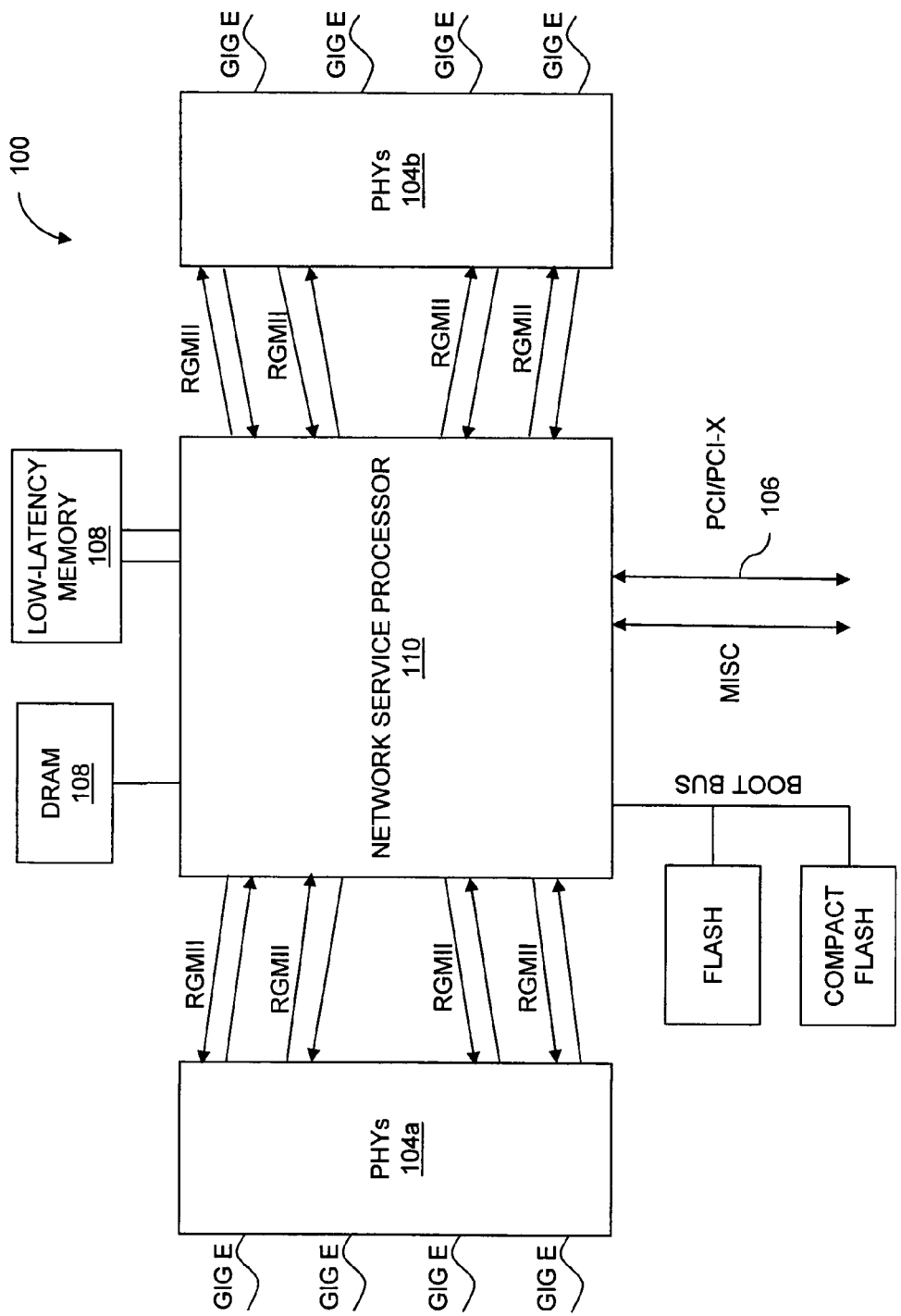
FIG. 1A is a block diagram of a network service processing system including a network services processor according to the principles of the present invention.

FIG. 1A is a block diagram of a security appliance 100 including a network services processor 110 according to the principals of the present invention. The security appliance 100 is a standalone system that can switch packets received at one Ethernet port (Gig E) to another Ethernet port (Gig E) and perform a plurality of security functions on received packets prior to forwarding the packets. For example, the security appliance 100 can be used to perform security processing on packets received on a Wide Area Network prior to forwarding the processed packets to a Local Area Network.

The network services processor 110 includes hardware packet processing, buffering, work scheduling, ordering, synchronization, and cache coherence support to accelerate all packet processing tasks. The network services processor 110 processes Open System Interconnection network L2-L7 layer protocols encapsulated in received packets.

The network service processor 110 receives packets from the Ethernet ports (Gig E) through physical interfaces PHY 104a, 104b, performs L7-L2 network protocol processing on the received packets and forwards processed packets through the physical interfaces 104a, 104b or through a PCI bus 106. The network protocol processing can include processing of network security protocols such as Firewall, Application Firewall, Virtual Private Network (VPN) including IP Security (IPSEC) and/or Secure Sockets Layer (SSL), Intrusion detection System (IDS) and Anti-virus (AV).

A Dynamic Random Access Memory (DRAM) controller 133 (FIG. 1B) in the network services processor 110 controls access to an external DRAM 108 that is coupled to the network services processor 110. The DRAM 108 stores data packets received from the PHYs interfaces 104a, 104b or the Peripheral Component Interconnect Extended (PCI-X) interface 106 for processing by the network services processor 110.

A low-latency memory controller 360 (FIG. 3B) in the network services processor 110 controls low-latency memory (LLM) 118. The LLM 118 can be used for Internet Services and Security applications allowing fast lookups, including regular expression matching that may be required for Intrusion Detection System (IDS) or Anti Virus (AV) applications.

Regular expressions are a common way to express string matching patterns. The atomic elements of a regular expression are the single characters to be matched. These are combined with meta-character operators that allow a user to express concatenation, alternation, Kleene-star, etc. Concatenation is used to create multiple character matching patterns from a single charters (or sub-strings) while alternation (|) is used to create patterns that can match any of two or more sub-strings. Kleene-star (*) allows a pattern to match zero (0) or more occurrences of the pattern in a string. Combining different operators and single characters allows complex expressions to be constructed. For example, the expression (th(is|at)*) will match th, this, that, thisis, thisat, thatis, thatat, etc.

Figure 1B:
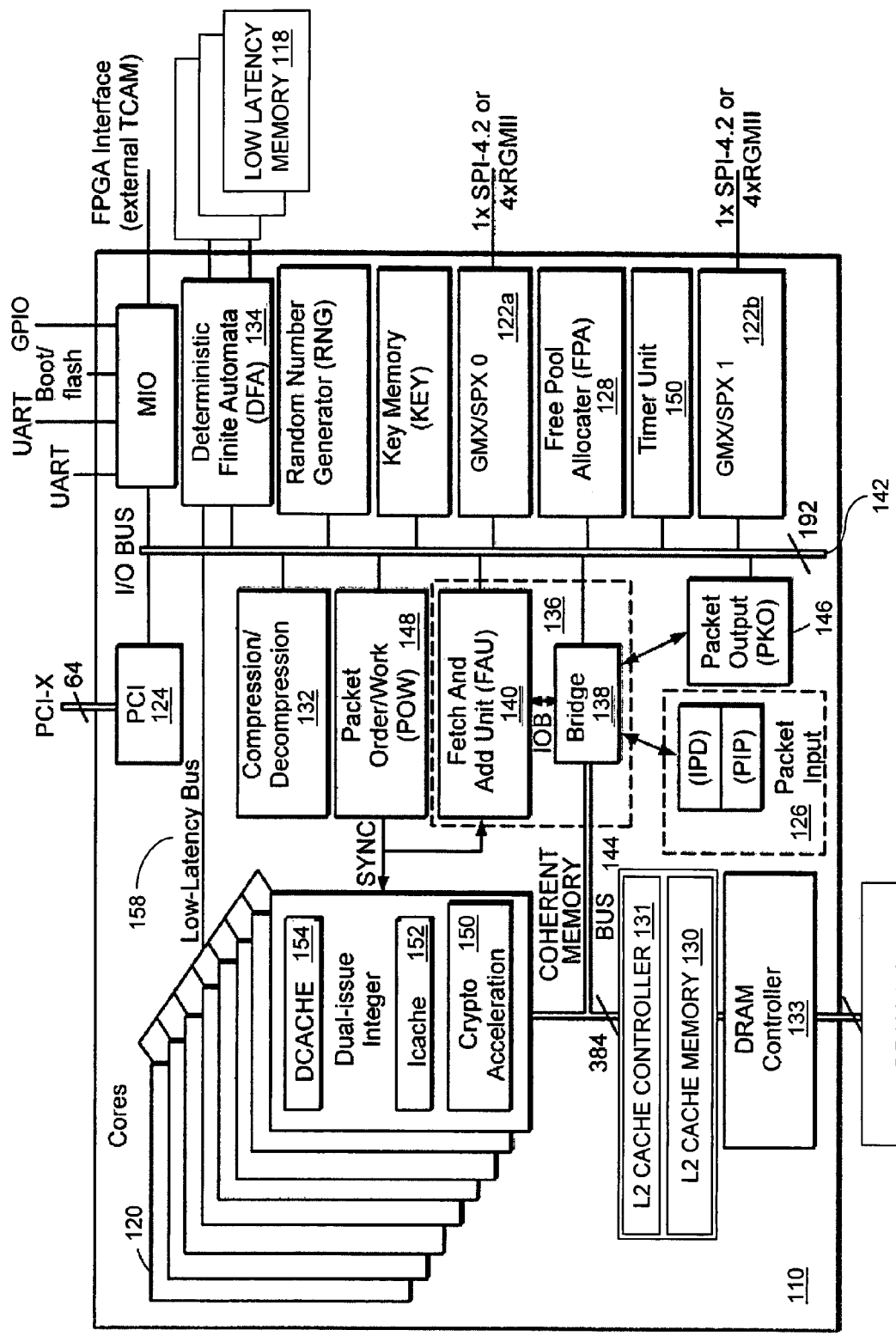
FIG. 1B is a block diagram of the network services processor shown in FIG. 1A.

FIG. 1B is a block diagram of the network services processor 110 shown in FIG. 1A. The network services processor 110 delivers high application performance using at least one processor core 120 as described in conjunction with FIG. 1A.

A packet is received for processing by any one of the GMX/SPX units 122a, 122b through an SPI-4.2 or RGM II interface. A packet can also be received by a PCI interface 124. The GMX/SPX unit (122a, 122b) performs pre-processing of the received packet by checking various fields in the L2 network protocol header included in the received packet and then forwards the packet to a packet input unit 126.

The packet input unit 126 performs further pre-processing of network protocol headers (L3 and L4) included in the received packet. The pre-processing includes checksum checks for Transmission Control Protocol (TCP)/User Datagram Protocol (UDP) (L3 network protocols).

A Free Pool Allocator (FPA) 128 maintains pools of pointers to free memory in level 2 cache memory 130 and DRAM 108. The input packet processing unit 126 uses one of the pools of pointers to store received packet data in level 2 cache memory 130 or DRAM 108 and another pool of pointers to allocate work queue entries for the processor cores 120.

The packet input unit 126 then writes packet data into buffers in Level 2 cache 130 or DRAM 108 in a format that is convenient to higher-layer software executed in at least one processor core 120 for further processing of higher level network protocols.

An I/O Interface (IOI) 136 manages the overall protocol and arbitration and provides coherent I/O partitioning. The IOI 136 includes an I/O Bridge (IOB) 138 and a Fetch and Add Unit (FAU) 140. Registers in the FAU 140 are used to maintain lengths of the output queues that are used for forwarding processed packets through the packet output unit 126. The IOB 138 includes buffer queues for storing information to be transferred between an I/O Bus 142, a coherent memory bus 144, the packet input unit 126 and the packet output unit 146.

A Packet order/work (POW) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores.

Processor cores 120 request work from the POW module 148. The POW module 148 selects (i.e., schedules) work for a processor core 120 and returns a pointer to the work queue entry that describes the work to the processor core 120.

The processor core 120 includes instruction cache 152, level 1 (L1) data cache 154 and crypto acceleration 156. In one embodiment, the network services processor 110 includes sixteen superscalar RISC (Reduced Instruction Set Computer)-type processor cores 120. In one embodiment, each superscalar RISC-type processor core 120 is an extension of the MIPS64 version 2 processor core.

Level 2 (L2) cache memory 130 and DRAM 108 is shared by all of the processor cores 120 and I/O co-processor devices. Each processor core 120 is coupled to the Level 2 cache memory 130 by the coherent memory bus 144. The coherent memory bus 144 is a communication channel for all memory and I/O transactions between the processor cores 120, the IOB 138 and the L2 cache memory 130 and a L2 cache memory controller 131. In one embodiment, the coherent memory bus 144 is scalable to 16 processor cores 120, supports fully coherent L1 data caches 154 with write through, is highly buffered and can prioritize I/O.

The L2 cache memory controller 131 maintains memory reference coherence. It returns the latest copy of a block for every fill request, whether the block is stored in L2 cache memory 130, in DRAM 108 or is in-flight. It also stores a duplicate copy of the tags for the data cache 154 in each processor core 120. It compares the addresses of cache block store requests against the data cache tags, and invalidates (both copies) a data cache tag for a processor core 120 whenever a store instruction is from another processor core or from an I/O component via the IOB 138.

A DRAM controller 133 supports up to 16 Mbytes of DRAM. The DRAM controller 133 supports a 64-bit or 128-bit interface to DRAM 108. The DRAM controller 133 supports DDR-I (Double Data Rate) and DDR-II protocols.

After the packet has been processed by the processor cores 120, the packet output unit (PKO) 146 reads the packet data from memory, performs L4 network protocol post-processing (e.g., generates a TCP/UDP checksum), forwards the packet through the GMX/SPC unit 122a, 122b and frees the L2 cache 130/DRAM 108 used by the packet.

The low-latency memory controller 360 (FIG. 3B) manages in-flight transactions (loads/stores) to/from the LLM 118. The low-latency memory (LLM) 118 is shared by all of the processor cores 120. The LLM 118 can be dynamic random access memory (DRAM), reduced latency dynamic random access memory (RLDRAM), synchronous random access memory (SRAM), fast cycle random access memory (FCRAM) or any other type of low-latency memory known in the art. The RLDRAM provides 30 nanosecond memory latency or better; that is, the time taken to satisfy a memory request initiated by the processor 120. Each processor core 120 is directly coupled to the LLM controller 360 by a low-latency memory bus 158. The low-latency memory bus 158 is a communication channel for content aware application processing between the processor cores 120 and the LLM controller 360. The LLM controller 360 is coupled between the processor cores 120 and the LLM 118 for controlling access to the LLM 118.

The network services processor 110 also includes application specific co-processors that offload the processor cores 120 so that the network services processor achieves high-throughput. The compression/decompression co-processor 132 is dedicated to performing compression and decompression of received packets. A deterministic finite automata (DFA) module 134 includes dedicated DFA engines 370 (FIG. 3B) to accelerate pattern and signature match necessary for anti-virus (AV), Intrusion Detection Systems (IDS) and other content processing applications at up to 4 Gbps.

Figure 2A:
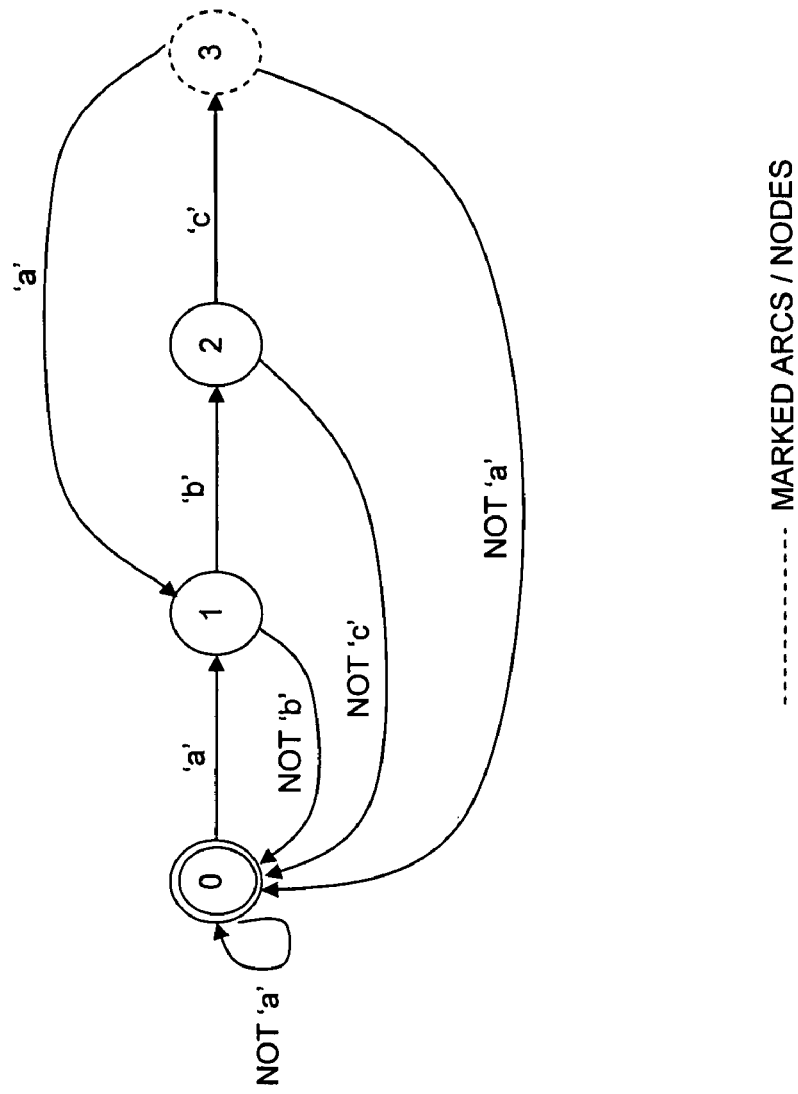
FIGS. 2A and 2B illustrates exemplary DFA graphs.

Content aware application processing utilizes patterns/expressions (data) stored in the LLM 118. The patterns/expressions may be in the form of a deterministic finite automata (DFA). The DFA is a state machine. The input to the DFA state machine is a string of (8-bit) bytes (i.e., the alphabet for the DFA is a byte). Each input byte causes the state machine to transition from one state to the next. The states and the transition function can be represented by a graph 200 as illustrated in FIG. 2A, where each graph node (Nodes 0 to 3) is a state and different graph arcs interconnecting the different nodes represent state transitions for different input bytes. The states may contain certain characters related to the state, such as 'A . . . Z, a . . . z, 0 . . . 9,' etc. The current state of the state machine is a node identifier that selects a particular graph node. The number of nodes can range from a few nodes up to about 128,000 nodes for a small graph size. Larger graph sizes can have up to 1,000,000 nodes or even more.

In an illustrative example, the DFA graph 200 is designed to search for a target string expression 'abc.' Thus, the DFA graph is used to search the input data for an exact match to the string of characters 'abc.' This expression is a fixed-length expression, that is, the number of nodes and thus the depth of the graph is known (i.e., fixed).

To create the DFA graph, the expression is parsed and a compiler creates a root node (i.e., node '0') adding nodes 1-3 to the graph for the intended expression (i.e., one additional node for each character of the target string of characters). Continuing with this example, an input stream of characters contains an exemplary string '12abc3.' The input string is searched using the DFA graph to identify the target string expression 'abc.'

The initial state of the DFA graph is node '0.' Each character, or byte, is sequentially read and the DFA remains at node 0, until the first character of the target string expression is read. For example, upon detecting the first character 'a' of the target string expression in the input stream, an arc labeled 'a' is followed from node 0 to node 1. The next character of the input stream is read. If it is anything other than the next character of the target string expression (i.e., 'b') is detected, an arc labeled 'not b' is followed from node 1 back to node 0. However, upon detecting the character 'b' as the next character in the input stream, an arc labeled 'b' is followed from node 1 to node 2. The next character of the input stream is read. If it is anything other than the next character of the target string expression (i.e., 'c'), an arc labeled 'not c' is followed from node 2 back to node 0. At node 2, however, upon detecting the character 'c' in the input stream, an arc labeled 'c' is followed from node 2 to node 3. As the target string expression 'abc' is a fixed-length expression, node 3 is a terminal node and the result of the search is reported, that is, that the expression 'abc' was found and the location of the expression in the input stream.

Other, more complicated DFA graphs can be similarly created by parsing one or more intended expressions with the compiler creating suitable nodes of the graph as required by the intended expressions. Thus, a single graph can be used to search for multiple expressions that may be fixed length, variable length, and combinations of fixed and variable length.

Figure 3A:
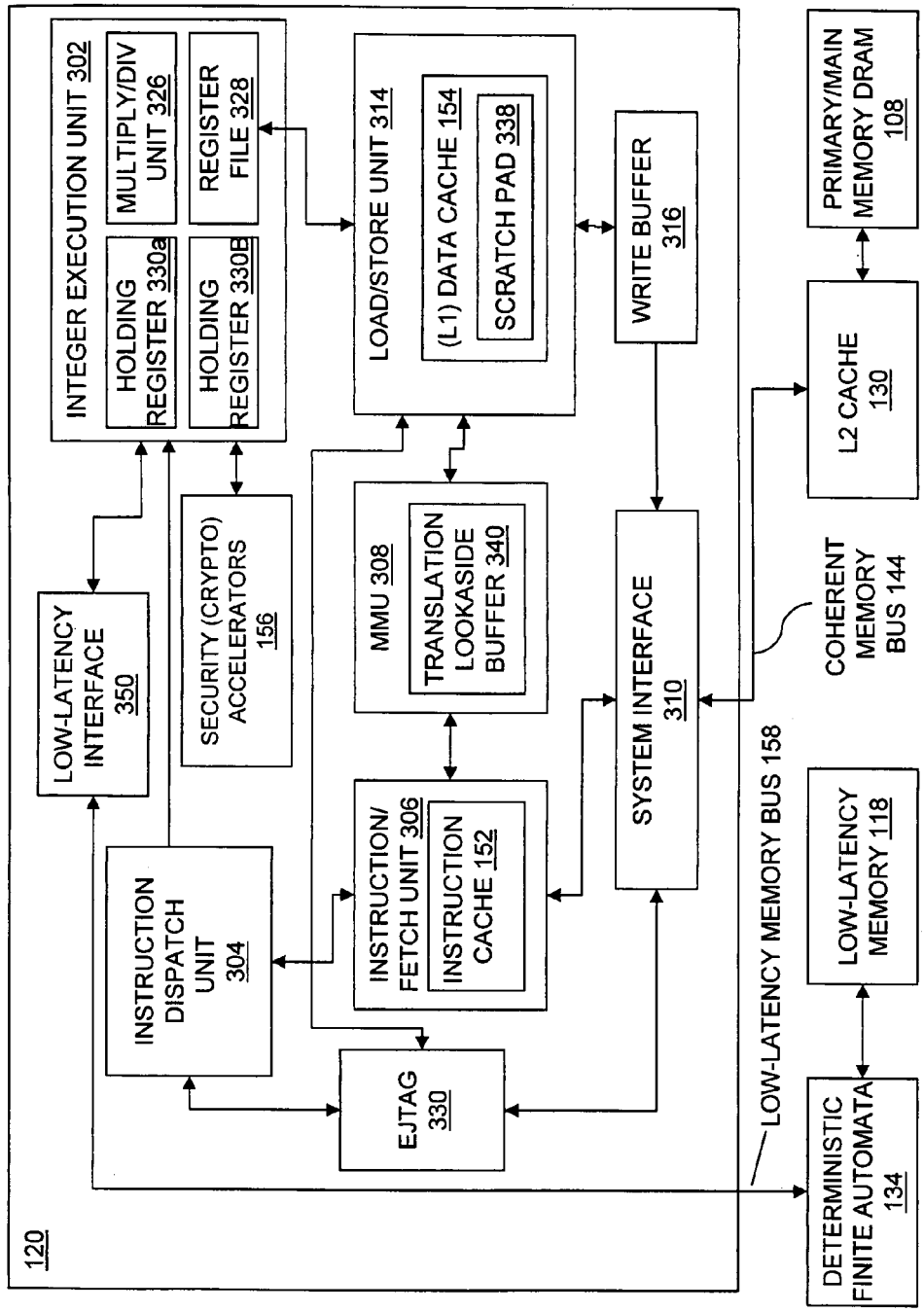
FIG. 3A is a block diagram of a Reduced Instruction Set Computing (RISC) processor according to the principles of the present invention.

FIG. 3A is a block diagram of a Reduced Instruction Set Computing (RISC) processor 120 according to the principles of the present invention. The processor (processor core) 120 includes an Integer Execution Unit 302, an Instruction Dispatch Unit 304, an Instruction Fetch Unit 306, a Memory Management Unit (MMU) 308, a System Interface 310, a Low-Latency Interface 350, a Load/Store unit 314, a Write Buffer 316, and Security Accelerators 156. The processor core 120 also includes an EJTAG Interface 330 allowing debug operations to be performed. The system interface 310 controls access to external memory, that is, memory external to the processor 120 such as, external (L2) cache memory 130 or primary/main memory 108.

The Integer Execution unit 302 includes a multiply unit 326, at least one register file (main register file) 328, and two holding registers 330a, 330b. The holding registers 330a, 330b are used to store data to be written to the LLM 118 and data that has been read from the LLM 118 using LLM load/store instructions. The holding registers 330a, 330b improve the efficiency of the instruction pipeline by allowing two outstanding loads prior to stalling the pipeline. Although two holding registers are shown, one or multiple holding registers may be used. The multiply unit 326 has a 64-bit register-direct multiply. The Instruction fetch unit 306 includes instruction cache (ICache) 152. The load/store unit 314 includes a data cache 154. In one embodiment, the instruction cache 152 is 32K bytes, the data cache 154 is 8K bytes and the write buffer 316 is 2K bytes. The Memory Management Unit 308 includes a Translation Lookaside Buffer (TLB) 340.

In one embodiment, the processor 120 includes a crypto acceleration module (security accelerators) 156 that include cryptography acceleration for Triple Data Encryption standard (3DES), Advanced Encryption Standard (AES), Secure Hash Algorithm (SHA-1), Message Digest Algorithm #5 (MD5). The crypto acceleration module 156 communicates by moves to and from the main register file 328 in the Execution unit 302. RSA and the Diffie-Hellman (DH) algorithm are performed in the multiplier unit 326.

Figure 3B:
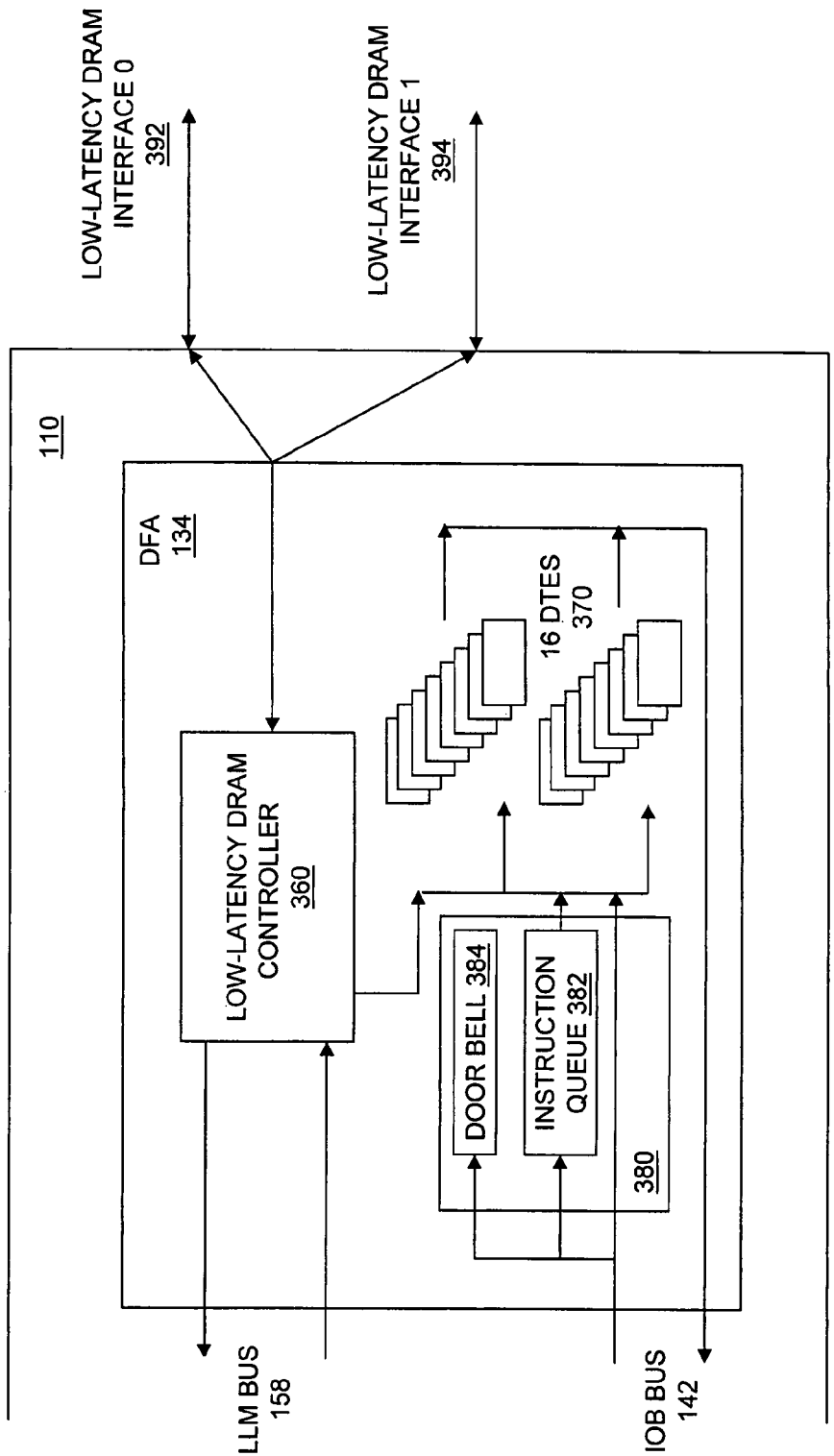
FIG. 3B is a block diagram of the DFA module of FIG. 3A.

FIG. 3B shows a block diagram of the DFA Module 134 of FIG. 3A. The DFA Module 134 includes a low-latency DRAM controller 360, at least one DFA Thread Engine (DTE) 370 (16 shown), and an Instruction Input Logic 380. The Instruction Input Logic 380 includes a DFA instruction queue 382 and a doorbell 384. The DFA instruction queue 382 queues DFA instructions stored in L2/DRAM (130/108) and the doorbell indicates how many DFA instructions are stored in the DFA instruction queue 382. The core 120 software can issue a doorbell write for each individual DFA instruction, or can accumulate multiple DFA instructions into a single doorbell write. Each DFA instruction includes information the DFA module 134 needs to start a DTE 370, read input data, traverse a DFA graph 200 stored in the LLM 118, and write results into L2/DRAM (130/108). The format of a DFA instruction will be described later in conjunction with FIG. 8A.

The DTEs 370 can be used for performing pattern searches. Generally, the DTEs 370 traverse the DFA graphs 200 (FIG. 2) (in LLM 118) with incoming packet data (in L2/DRAM (130/108)) to search for a particular expression in the packet data. For example, the network services processor may be simultaneously tracking up to 1,000 TCP input streams, with each stream sent to a different DTE to search for a particular expression. Prior to traversal software in the cores 120 must first (i) preload the DFA graphs in the LLM 118 via the LLM bus 158; (ii) preload DFA instructions in L2/DRAM (130/108); and (iii) submit the DFA instructions to the DFA module 134 via the IOB 142. The DFA instructions indicate the DFA graph 200 to traverse with the incoming packet data. After which, the DFA module 134 fetches and queues the DFA instructions, and schedules each DFA instruction to one of the 16 available DTEs 370. The DTEs 370 are all identical and equivalent such that any DFA instruction may be scheduled to any available DTE 370. Once a DTE 370 receives an instruction, it simultaneously (a) fetches packet data from the L2/DRAM (130/108) via the IOB 142; (b) issues one LLM DRAM load per byte of packet data to traverse to the next DFA graph state for the byte; and (c) writes intermediate and final results back to the L2/DRAM (130/108) via the IOB 142.

Generally, the DTEs 370 are state machines that can be implemented using hardware, software, or combinations of hardware and software. In some embodiments, the DTEs 370 are implemented in hardware using combinational logic. In other embodiments each of the DTEs 370 is respectively implemented on a different processor. In still other embodiments, the DTEs 370 are implemented using a common processor. For example, each of the DTEs 370 can be a separate task (i.e., sequence of instructions) running on a common processor adapted to provide a shared, multitasking environment. Multitasking is a technique used in an operating system to share a single processor between several independent jobs (i.e., DTEs 370). Alternatively or in addition, each of the DTEs 370 can be a separate process thread running on a common processor adapted to provide a multithreading capability. Multithreading differs from multitasking in that threads generally share more of their environment with each other than do tasks under multitasking. For example, threads may be distinguished by the value of their program counters and stack pointers while sharing a single address space and set of global variables.

Figure 4A:
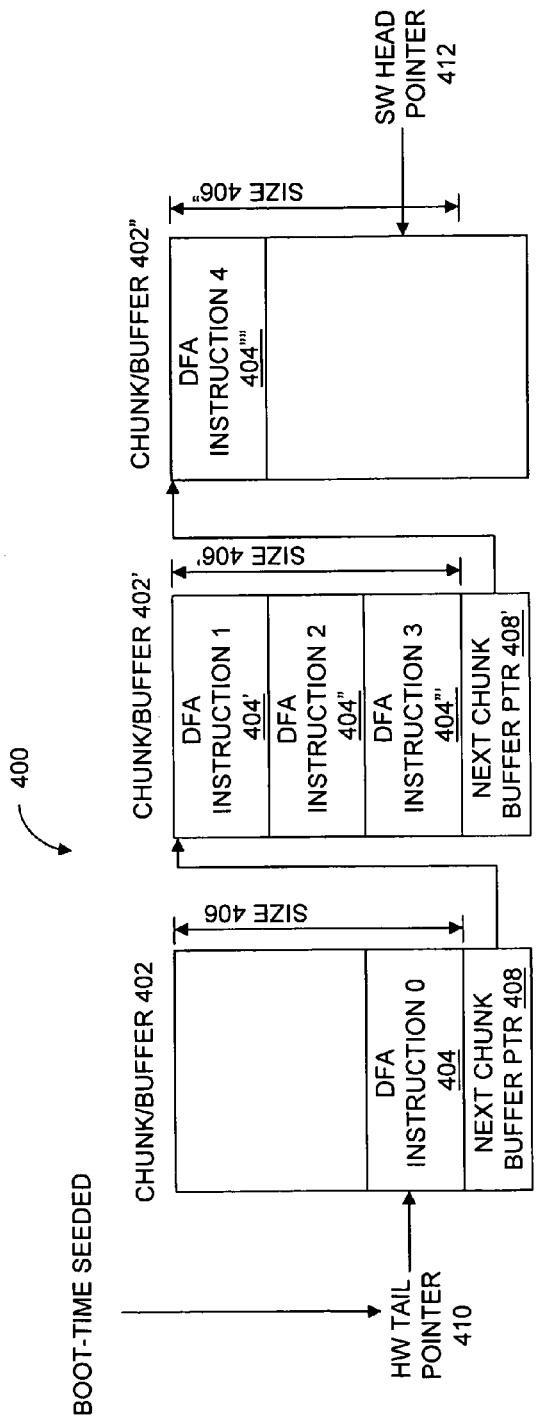
FIG. 4A illustrates a structure of a DFA instruction queue.

FIG. 4A illustrates a structure of a DFA instruction queue 400 stored in the L2/DRAM (130/108). Each instruction queue is a linked-list of chunks/buffers 402. Each chunk 402 includes at least three DFA instructions 404 which make up the total chunk size 406. A next chunk buffer pointer 408 immediately follows the last DFA instruction 404 in the chunk 402 if another chunk (e.g., 402') exists.

To insert a packet into the DFA instruction queue 400, the core 120 software writes a DFA instruction 404 into the DFA instruction queue 400, allocating chunks if necessary, and then writes to the DFA doorbell 384 with the number of DFA instructions 404 added to the DFA instruction queue 400. The DFA module 134 reads from the DFA instruction queue 400 (starting at the tail 410), and traverses the next chunk buffer pointer 408 to the next chunk (e.g., 402'/402'') when it reaches the last instruction of a chunk (e.g., 404/404'''). When the DFA module 134 jumps chunks 402 it frees the preceding chunk (e.g., 402/402'') to the FPA 128 (FIG. 1B).

The DFA module 134 maintains a tail pointer 410 for the DFA instruction queue 400 and the core 120 software maintains the head pointer 412 for the DFA instruction queue 400. The distance between the tail pointer 410 and the head pointer 412 is both the size of the DFA instruction queue 400 and the outstanding doorbell count. The size of the DFA instruction queue 400 is limited only by the available memory and the 20-bit outstanding doorbell counter for the DFA instruction queue 400.

Figure 4B:
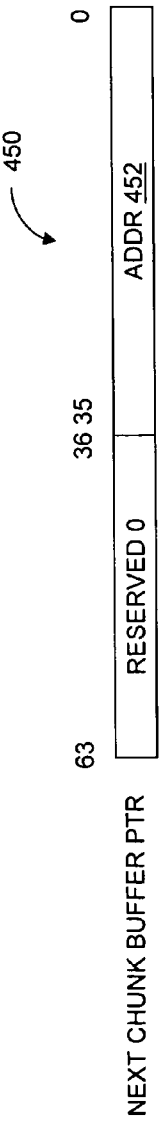
FIG. 4B illustrates a next chunk buffer pointer instruction format.

FIG. 4B illustrates a next chunk buffer pointer format 450. The next chunk buffer pointer is a 64-bit word and contains a 36-bit address (Addr) field 452. The Addr field 452 selects a valid L2/DRAM (130/108) byte location of the next chunk 400 containing the next DFA instruction 402. Though Addr field 452 is a byte address, it is naturally aligned on a 128 byte cache block boundary, by setting its least-significant 7 bits to zero.

Figure 5A:
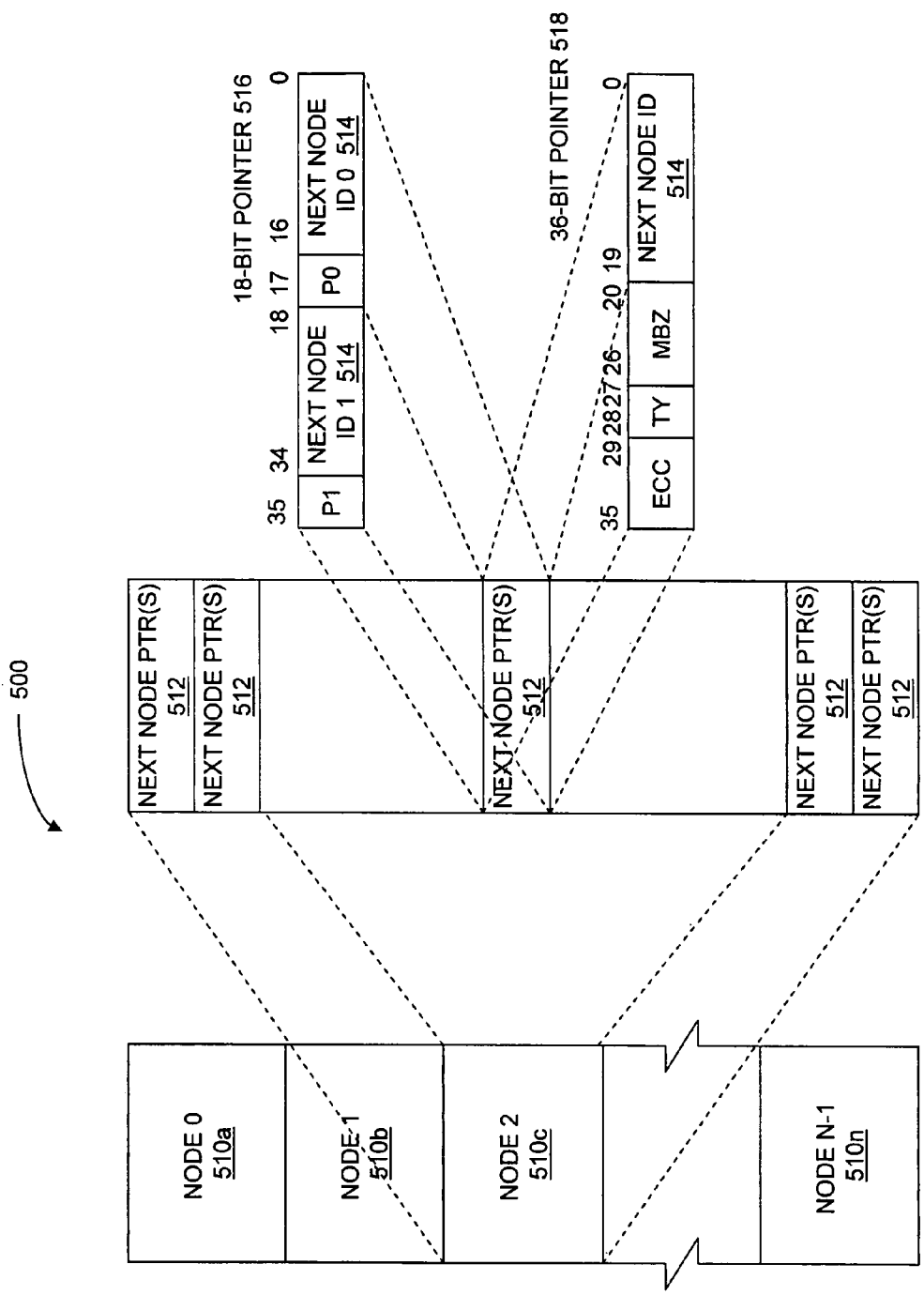
FIG. 5A illustrates another embodiment of a typical DFA graph.

FIG. 5A illustrates the structure of a DFA graph 500 stored in the LLM 118. The DFA graph 500 includes N nodes 510*a*-510*n*. Each node 510 in the DFA graph 500 is a simple array of 256 Next-Node Pointers 512, one for each unique input byte value. Each Next-Node Pointer 512 contains a Next Node ID 514 that directly specifies the next node/state for the input byte.

The DFA module 134 supports either an 18-bit Next-Node Pointer stored format 516 or 36-bit Next-Node Pointer stored format 518. For an 18-bit pointer, each node 510 requires 18*256-bits or 512 bytes of LLM 118 storage. Each Next-Node Pointer 516 is a 17-bit Next Node ID and a parity bit. The parity is even (i.e., P=XOR (exclusive OR) of all bits in the 17-bit Next Node ID 514). For a 36-bit pointer, each node 510 requires 36*256-bits or 1 KB of LLM 118 storage. Replication can increase storage requirements. Each Next-Node Pointer 518 is a 20-bit Next Node ID, a two bit type value, a 7 bit SECDED ECC code, and seven unused bits that must be set to zero. A DTE 370 uses the SECDED ECC code in the 36-bit pointer to automatically repair all single bit errors, and to detect all double bit errors. The type value indicates the next node type, for example: 0=Normal; 1=Marked; and 2=Terminal.

The DTEs 370 support three special node pointer conditions:
1. PERR—The next-node pointer includes an error. The DTE 370 creates a result word indicating the failing LLM 118 location. The DTE 370 terminates the graph 500 traversal;
2. TERM—The next node is a terminal node and the graph traversal should stop. The DTE 370 creates a result word indicating the byte that traversed to the terminal node, the prior Node ID, and the next Node ID. The DTE 370 terminates the graph 500 traversal; and 3. MARKED—This transition is marked for later analysis by core 120 software. The DTE 370 creates a result word indicating the byte that traversed to the marked node, the prior Node ID, and the next Node ID. The DTE 370 continues the graph 500 traversal.

For 18-bit mode, the DTE 370 determines the special TERM and MARKED conditions by comparing the Next Node ID. In this case, all transitions entering a marked node are marked. For 36-bit mode, the DTE 370 determines the special TERM and MARKED conditions directly from the type field in the Next-Node Pointer. The individual transitions, not just individual nodes, can be marked in 36-bit mode.

Figure 5B:
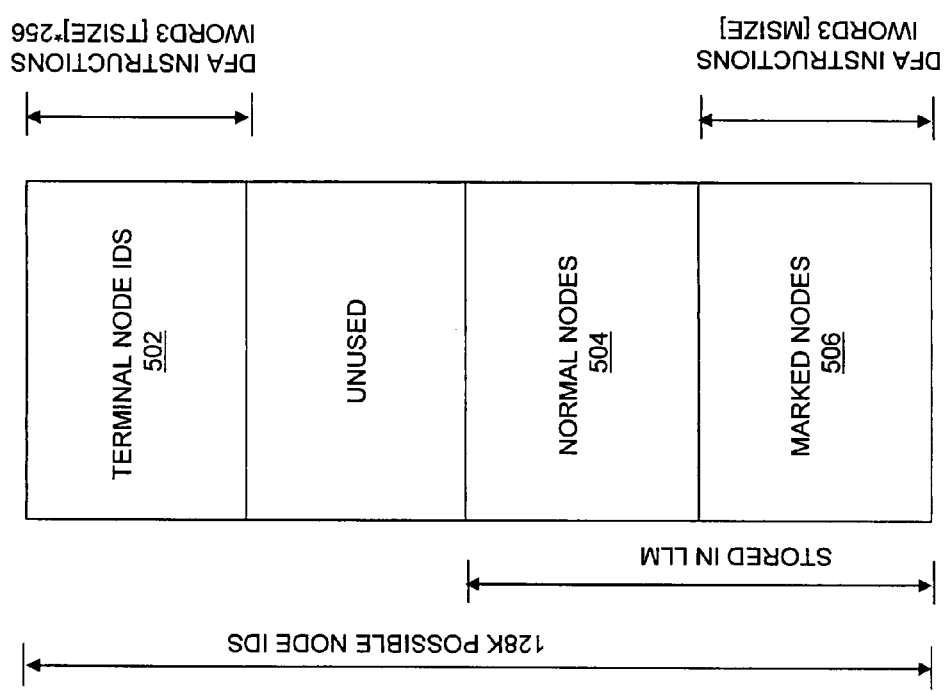
FIG. 5B illustrates different possible node ids of the DFA graph of FIG. 5A.
Figure 8A:
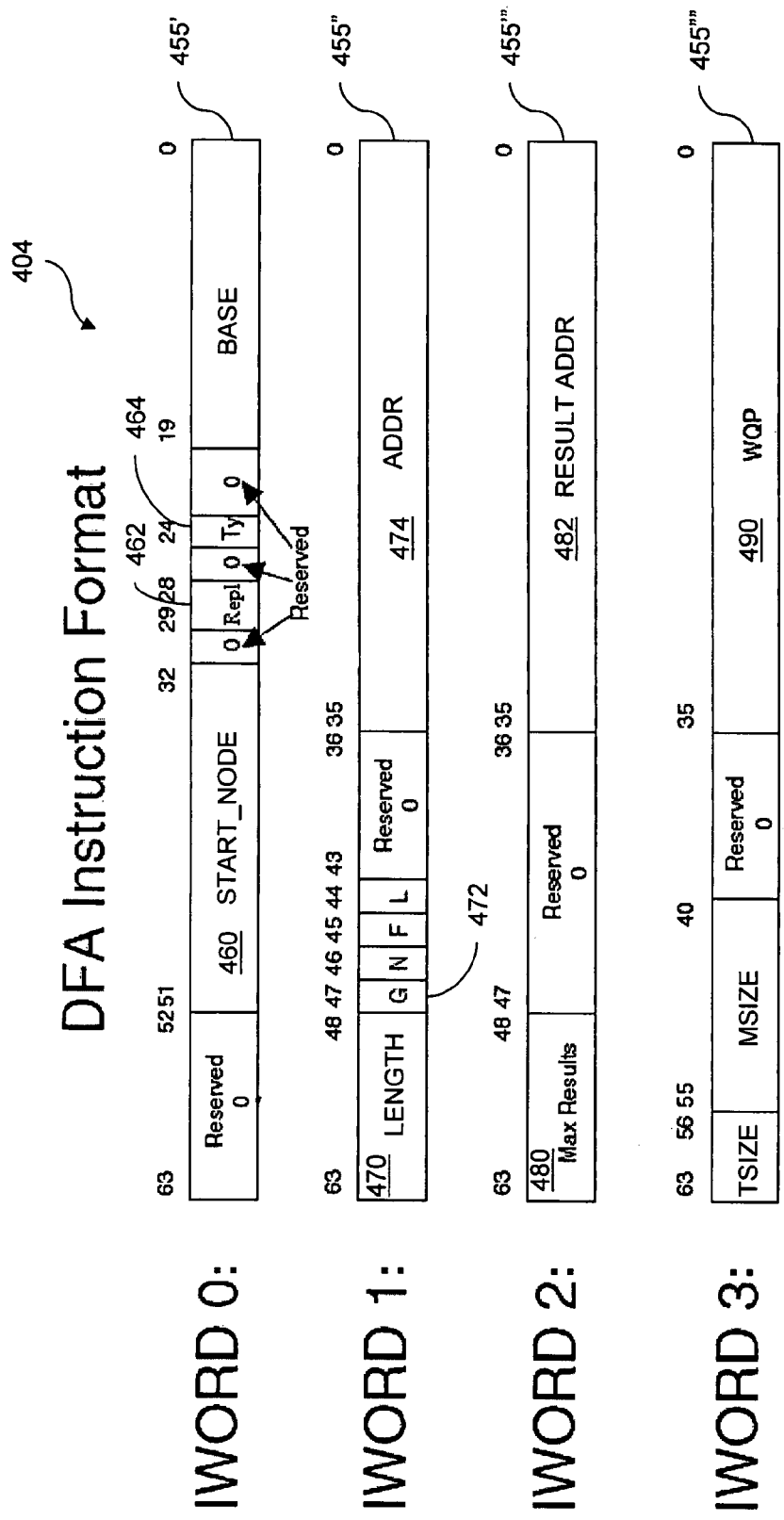
FIG. 8A illustrates a DFA instruction format.

FIG. 5B shows all possible 17-bit Node IDs and how they are classified in 18-bit mode. The terminal Node IDs 502 are not backed by actual storage in the LLM 118. However, the Normal nodes 504 and Marked nodes 506 are backed by actual LLM 118 storage. The DFA instruction 404 (FIG. 8A) contains the number 503 of terminal nodes, TSize stored in IWORD3 (FIG. 8A), and the number 507 of marked nodes, MSize also stored in IWORD3 (FIG. 8A).

As the DTEs 370 traverse graphs 500, they produce result words as exceptional conditions arise. Next-node pointers that are MARKED, TERM or PERR are exceptional. Two more exceptional conditions are: completions of input data and exhaustion of result space. Though a graph traversal for an input byte may result in multiple exceptional conditions, a single input byte can produce, at most, one result word. For example, the last input byte will encounter the completions of input data condition and will produce a result word. The last input byte may also encounter a marked next node, but a second result word is not created. Graph traversal stops when a (priority ordered) PERR, TERM, completions of input data and exhaustion of result space exception condition occurs and the DTE 370 reports the highest priority condition. For example, referring to the graph in FIG. 2, the next node is a terminal node upon reaching node 'c' and the DTE 370 terminates the graph traversal.

Each DFA instruction can specify how the data to be processed by the DTE 370 is stored in L2/DRAM. In either case (direct or gather), the DFA module 134 reads the bytes from L2/DRAM (130/108).

Figure 6:
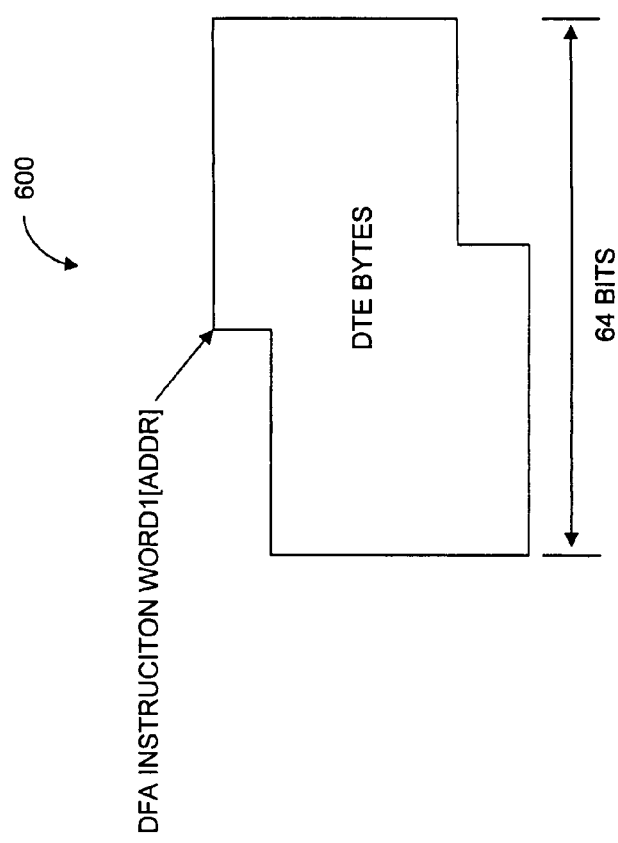
FIG. 6 shows an example of direct mode to construct data to be processed by the DTEs.

FIG. 6 shows an example direct mode 600 to get the data to be processed by the DTE 370. The DFA instruction 404 directly specifies the starting location and number of bytes. The DTE 370 that processes the corresponding DFA instruction 404 reads the contiguous bytes from L2/DRAM (130/108) and processes them.

Figures 7A, 7B:
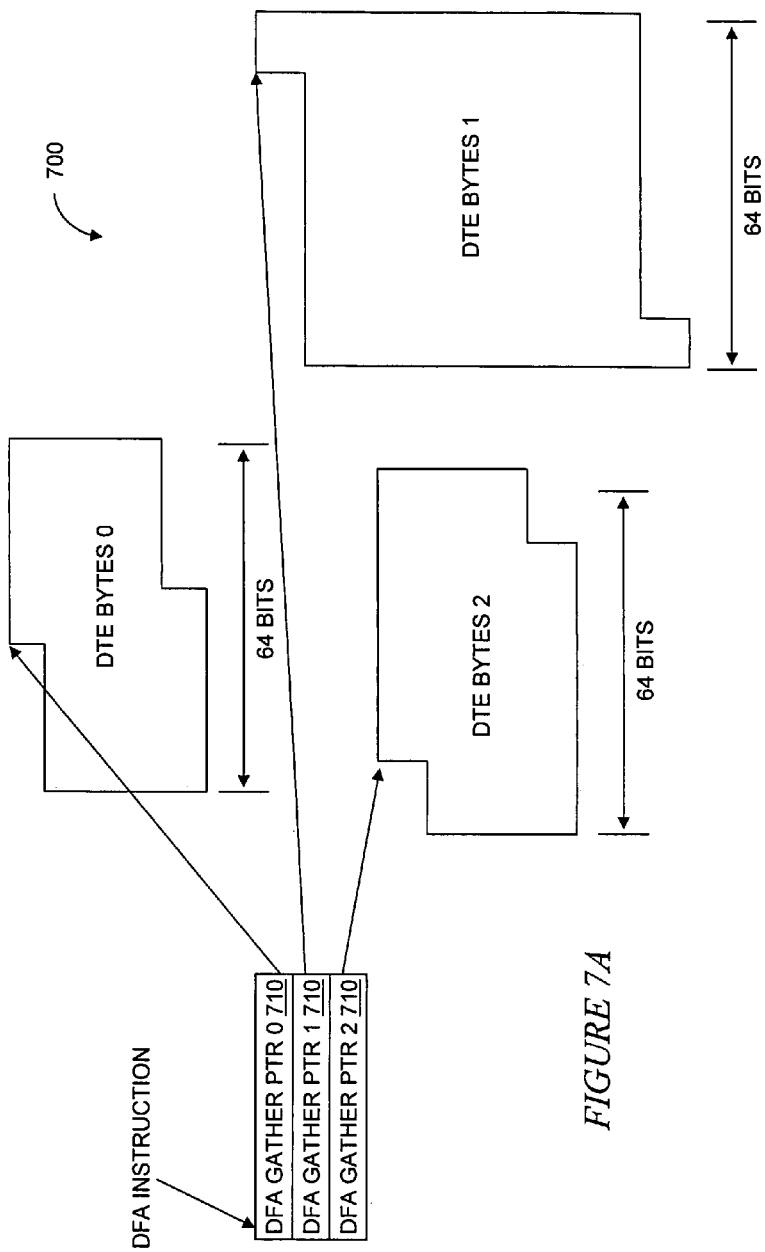
FIG. 7A shows an example of gather mode to construct data to be processed by the DTEs.
FIG. 7B illustrates a DFA gather pointer instruction format.

FIG. 7A shows an example gather mode 700 to get the data to be processed by the DTE 370. The DFA instruction 404 directly specifies the starting location and size of the DFA gather pointer 710 list. Each DFA gather pointer 710 list entry specifies the starting location and number of bytes for the DTE 370 to process. The total input byte stream for the DTE 370 is the concatenation of the bytes specified by each gather pointer 710 list entry.

FIG. 7B shows the format of the 64-bit DFA gather pointer 710. The DFA gather pointer 710 includes a length 712 (in bytes) and an address field 714 (an L2/DRAM address). The DFA gather pointer 710 is naturally-aligned on a 64-bit boundary, but the bytes in L2/DRAM that it points to can be any byte alignment. In the gather mode 700, the total number of bytes is the sum of the length fields in all the DFA gather pointers 710.

Referring again to FIG. 4A, each DFA instruction 404 provides the information needed by the DFA module 134 to: (i) start a DTE 370; (ii) read input data; (iii) traverse the graph 200 in the LLM 118; and (iv) write results. A DFA instruction 404 can include multiple instruction words, such as the exemplary DFA instruction format shown in FIG. 8A. Each DFA instruction 404 includes four independent words 455', 455", 455''', 455'''' (generally 455). The words each include 64-bits, representing a total of 32 bytes within level 2 cache memory 130 or DRAM 108. Preferably, each DFA instruction 404 is naturally-aligned on a 32 byte boundary. The DFA instructions 404 are processed by the respective DTE 370 to which the instruction has been scheduled. The DFA instruction 404 includes fields identifying both the input byte locations as well as the result location.

In operation, the DFA module 134 reads DFA instructions 404 and input data from level 2 cache memory 130 or DRAM 108 when the DFA instruction queue 382 has a valid DFA instruction 404, and writes the results as it creates them (e.g., byte-by-byte). The DFA module 134 can also optionally submit a work queue entry to be scheduled by the POW 148 (FIG. 1B) after finishing, so the DFA instruction 404 can include a field for a work queue pointer.

In more detail, the first DFA instruction word 455' includes a start node ID 460 identifying the particular DFA graph to be used by its first node. The first word 404 also provides additional information, such as a replication field 462 storing a replication value corresponding to the number of replications of the identified graph stored within the LLM 118. A type value 464 can also be provided, indicative of the type of addressing used (18 or 36-bit). The exemplary 64-bit word also includes one or more reserved fields.

The second DFA instruction word 455" includes a length field 470 identifying the number of bytes to be processed by the DFA module 134 and an address field 474 identifying within level 2 cache memory 130 or DRAM 108 the location of the packet data to be processed.

The third DFA instruction word 455''' includes a results address field 482 identifying an address (e.g., an address in level 2 cache memory 130 or DRAM 108) into which any results should be written, along with a maximum results field 480 storing a value indicative of the maximum number of results allowed. Still further, the DFA module 134 can also optionally submit a work queue entry after finishing, so the DFA instruction 404 includes a work queue processing (WQP) field 490 for one or more work queue pointers.

Figure 8B:
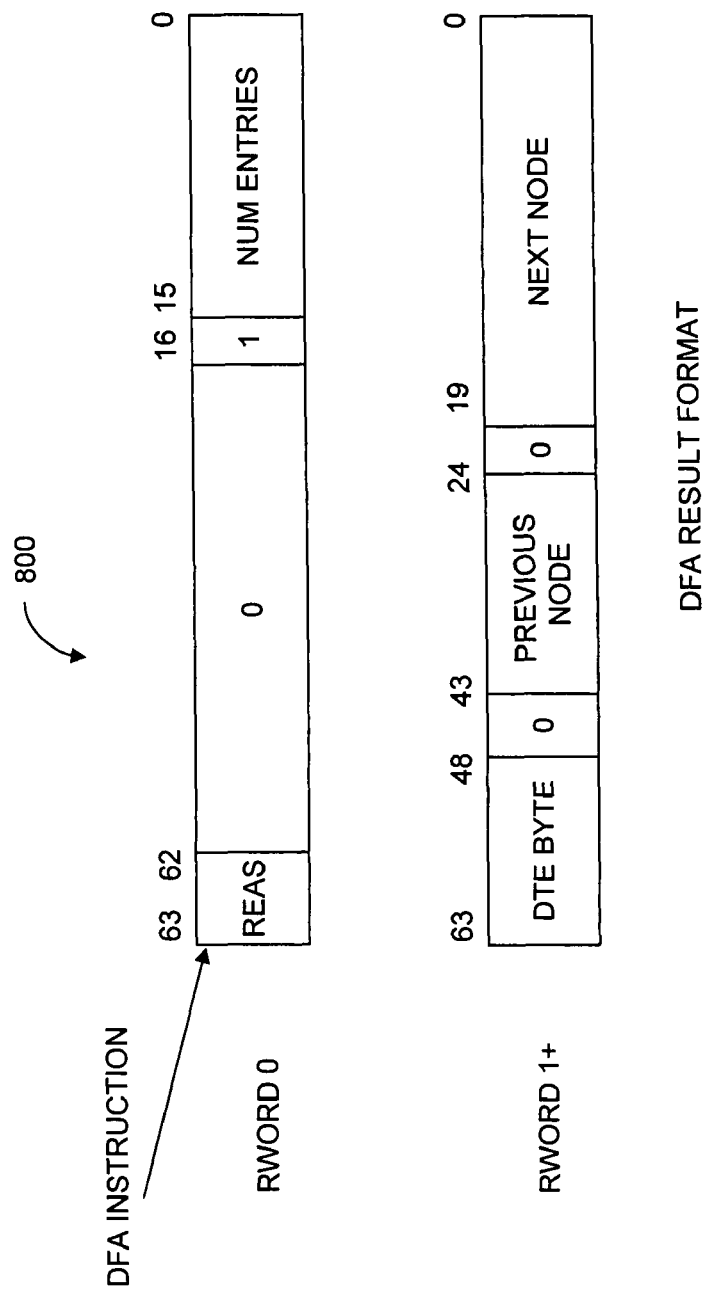
FIG. 8B illustrates a DFA result format.

FIG. 8B shows the result format 800 for a DFA instruction 404. The DFA result 800 has two or more 64-bit words in L2/DRAM (130/108). Each word is naturally aligned in L2/DRAM (130/108). The DFA module 134 writes these words to L2/DRAM (130/108) during and after it processes the DFA instruction 404. The structure is variable length to accommodate DFA instructions 404 that hit a variable number of marked nodes, but the result length can be limited by the maximum results of the DFA instruction field.

As described previously, it is possible to associate a node-type with any one or more of the nodes of a DFA graph by using the type field provided with the 36-bit pointer 518 (FIG. 5A). As the DTEs 370 traverse the graphs, they produce result words as exceptional conditions arise. At least one exceptional condition is a terminal node. When a terminal node is encountered by the DTE 370, it signifies that the end of a DFA graph has been reached and traversal by the DTE 370 will stop. Another example of an exceptional condition is a marked node. In contrast to a terminal node, traversal of the graph will not necessarily stop when a marked node is encountered by the DTE 370. A result, however, will be written into the output word identifying the particular marked node for later analysis. Thus, marked nodes can be used to identify when the corresponding nodes in a graph are traversed.

Note that WORD 0 of the DFA result 800 may be written more than once by the DFA module 134. Only the last write to WORD 0 contains the valid DFA result 800. Though the DFA module 134 may write WORD 0 multiple times, only the last write can set bit 16, and bit 16 will not be set by the DFA module 134 until it completes the DFA instruction 404. By writing bit 16 of WORD0 of the result to zero before it submits the DFA instruction 404 to the DFA module 134, software can poll bit 16 of WORD0 to determine when the DFA module 134 completes the DFA instruction. When bit 16 of WORD0 of the DFA result is set, the entire result is present.

Figure 2B:
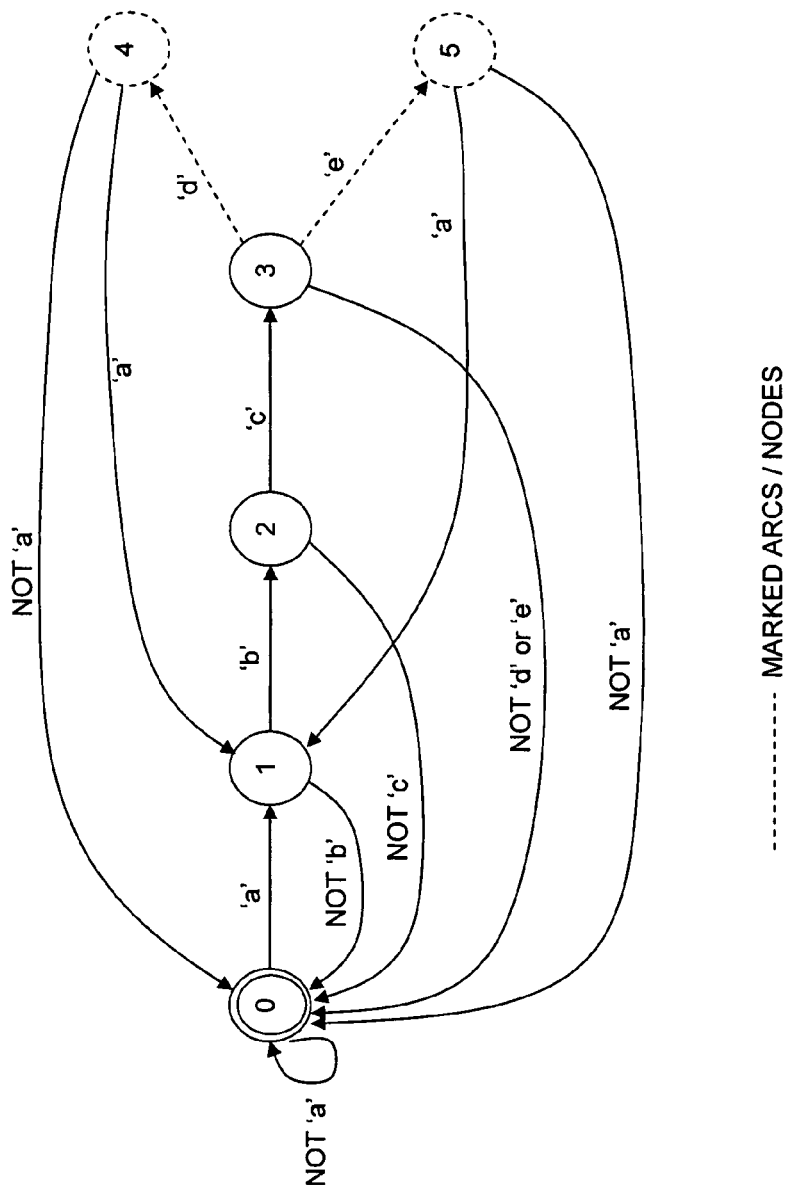

In another example illustrated in FIG. 2B, the graph of FIG. 2A is extended to find one or more occurrences of two different strings: 'abcd' and 'abce.' Thus, two additional nodes, Nodes 4 and 5, are added to the graph of FIG. 2A, one node, respectively, for the fourth character of each of the two strings (e.g., Node 4 for 'd' and Node 5 for 'e'). Nodes 4 and 5 are connected to Node 3, as shown, as the first three characters are the same for either string. Preferably, all occurrences of either string are identified on a single "pass" through the input string.

An exemplary input string, such as the string 'xwabcd454abceabcdsfk,' is run through the DFA resulting in three "marked" transitions. The marked transitions occur at the end of the string segments located within the input string (e.g., one at each position where a 'd' or 'e' is present). Thus, three marked transitions indicate that three strings were found. The first and last marks show the transition from Node 3 to Node 4, indicating the presence and location of the string 'abcd' within the input string (i.e., DTE byte=5, previous 3, next 4 and DTE Byte 17, previous=3, next=4). The middle marked node shows the transition from Node 3 to Node 5, indicating the presence of the string 'abce' within the input string (i.e., DTE Byte=13, previous=3, next=5). Using an 18-bit pointer, Nodes 4 and 5 are marked. Using a 36-bit pointer, the arcs from Node 3 to Nodes 4 and 5 are marked. Thus, by using the DFA marking technique in combination with the DFA thread engines, the presence and location of multiple, different strings can be found within the same input string, in a single pass through the input string.

This application is related to U.S. Provisional Patent Application No. 60/609,211, filed Sep. 10, 2004; U.S. patent application Ser. No. 11/024,002, filed Dec. 28, 2004; U.S. Provisional Patent Application No. 60/669,603, entitled "Deterministic Finite Automata (DFA) Instruction" filed on Apr. 8, 2005; and U.S. Provisional Patent Application No. 60/669,655, entitled "Selective Replication of Data Structures" filed on Apr. 8, 2005 The entire teachings of the above applications are incorporated herein by reference.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network processor, comprising:
at least one processor core;
a deterministic finite automata (DFA) module operating asynchronously to the at least one processor core, the DFA module traversing a plurality of nodes of at least one DFA graph stored in a non-cache memory that is: i) external to the network processor and ii) sized to accommodate the at least one DFA graph having a number of nodes for searching for multiple patterns in one traversal of the at least one DFA graph, the DFA module including a plurality of DFA thread engines associated in a shared configuration with the at least one processor core;
and responsive to instructions for traversing the plurality of nodes of the at least one DFA from the at least one processor core, with packet data stored in a cache-coherent memory, each of the plurality of DFA thread engines is configured to:
traverse at least one DFA graph independent of others of the plurality of DFA thread engines traversing DFA graphs including the at least one DFA graph,
fetch the packet data stored in the cache-coherent memory,
in response to each byte of packet data fetched from the cache-coherent memory, issue an instruction to access and load a next node of the at least one DFA graph from the non-cache memory to traverse the next node of the at least one DFA graph, and
write intermediate and final results of traversing the at least one DFA graph to the cache-coherent memory.

2. The network processor of claim 1, wherein the DFA module includes:
a non-cache memory controller adapted to access the memory storing the at least one DFA graph;
at least one of the plurality of DFA thread engines in communication with the non-cache memory controller; and
instruction input logic adapted to schedule instructions from the at least one processor core to the at least one of the plurality of DFA thread engine engines.

3. The network processor of claim 2, further comprising an instruction queue into which the at least one processor core submits DFA instructions directed to the DFA module.

4. The network processor of claim 3, wherein the DFA module maintains a pointer to the instruction queue.

5. The network processor of claim 3, wherein the DFA instructions indicate the packet data stored in the cache-coherent memory to use and the at least one DFA graph stored in the non-cache memory to traverse.

6. The network processor of claim 3, wherein the DFA module schedules the DFA instruction to the at least one of the plurality of DFA thread engine engines.

7. The network processor of claim 1, further comprising a result word into which the intermediate and final results are written.

8. The network processor of claim 7, wherein the result word includes an instruction-completed field indicative of a completed DFA instruction when set.

9. The network processor of claim 1, further comprising a node-type identifier for identifying types of nodes of the at least one DFA graph.

10. The network processor of claim 9, wherein the node-type identifier is a marked node, traversal of the marked node unhindering traversal of the graph for identifying a particular node for analysis.

11. A method of traversing DFA graphs with incoming packet data, comprising:
storing at least one DFA graph, having a number of nodes for searching for multiple patterns in one traversal of the at least one DFA graph, in a non-cache coherent memory that is: i) external to a processor and ii) sized to accommodate the at least one DFA graph;
storing in a cache-coherent memory, a DFA instruction for traversing nodes of the at least one DFA, the DFA instruction indicating packet data stored in the cache-coherent memory to use and the at least one DFA graph stored in the non-cache memory to traverse;

traversing the at least one DFA graph by: i) fetching the packet data stored in the cache-coherent memory, and ii) in response to each byte of packet data fetched from the cache-coherent memory, issuing an instruction to access and load a next node of the at least one DFA graph from the non-cache memory to traverse the next node of the at least one DFA graph; and writing intermediate and final results of the traversing to the cache-coherent memory, the at least one DFA graph being traversed by a DFA thread engine that is independent of other DFA thread engines traversing DFA graphs, including the at least one DFA graph.

12. The method of claim 11, further comprising providing a node-type identifier for identifying a respective node type for each of the nodes of the DFA graph, wherein the intermediate and final results are determined from the node-type identifiers.

13. A network processor, comprising:

means for storing at least one DFA graph in a non-cache coherent memory that is: i) external to the network processor and ii) sized to accommodate the at least one DFA graph having a number of nodes for searching for multiple patterns in one traversal of the at least one DFA graph;

means for storing in a cache-coherent memory, a DFA instruction for traversing the plurality of nodes of the at least one DFA, the DFA instruction indicating packet data stored in the cache-coherent memory to use and the at least one DFA graph stored in the non-cache memory to traverse;

means for traversing the at least one DFA graph by: i) fetching the packet data stored in the cache-coherent memory, and ii) in response to each byte of packet data fetched from the cache-coherent memory, issuing an instruction to access and load a next node of the at least one DFA graph from the non-cache memory to traverse the next node of the at least one DFA graph, the means for traversing being independent of other means for traversing DFA graphs including the at least one DFA graph, the means for traversing searches a data packet different for data packets being searched by the other means for traversing;

means for writing intermediate and final results of the traversing to the cache-coherent memory.

* * * * *

UNITED STATES PATENT AND TRADEMARK OFFICE
CERTIFICATE OF CORRECTION

| | | |
|---|---|---|
| PATENT NO. | : 8,392,590 B2 | Page 1 of 1 |
| APPLICATION NO. | : 11/221408 | |
| DATED | : March 5, 2013 | |
| INVENTOR(S) | : Bouchard et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1394 days.

Signed and Sealed this
Eighteenth Day of November, 2014

Michelle K. Lee
*Deputy Director of the United States Patent and Trademark Office*